United States Patent
Komatsu et al.

[11] Patent Number: 5,961,943
[45] Date of Patent: Oct. 5, 1999

[54] REGULARLY-SHAPED ALUMINOSILICATE AND ITS USE

[75] Inventors: Yoshinobu Komatsu; Hiroshi Ogawa; Kazuyoshi Sugano; Hideyuki Nakagawa, all of Tokyo, Japan

[73] Assignee: Mizusawa Industrial Chemicals, Ltd., Tokyo, Japan

[21] Appl. No.: 08/903,767

[22] Filed: Jul. 31, 1997

[51] Int. Cl.$^6$ ............................ C01B 33/26; C08K 3/34
[52] U.S. Cl. .................. 423/328.2; 524/443; 501/154
[58] Field of Search .................. 423/328.2, 332; 501/128, 133, 154; 524/443

[56] References Cited

U.S. PATENT DOCUMENTS

| | | | |
|---|---|---|---|
| 4,725,390 | 2/1988 | Laird et al. | |
| 4,810,682 | 3/1989 | Andrews | 501/146 |
| 4,814,303 | 3/1989 | Chowdry et al. | 501/128 |
| 5,036,030 | 7/1991 | Taga et al. | 501/328.2 |
| 5,064,790 | 11/1991 | Bedard et al. | 501/128 |
| 5,071,801 | 12/1991 | Bedard et al. | 501/128 |
| 5,179,051 | 1/1993 | Bedard et al. | 501/128 |
| 5,192,722 | 3/1993 | Bedard et al. | 501/128 |
| 5,298,234 | 3/1994 | Nakazawa et al. | 501/154 |

FOREIGN PATENT DOCUMENTS

95/29134  11/1995  WIPO.

Primary Examiner—Mark L. Bell
Assistant Examiner—David Sample
Attorney, Agent, or Firm—Sherman and Shalloway

[57] ABSTRACT

A regularly-shaped aluminosilicate useful as a blending agent for resins and coating materials, featuring low hygroscopic property, excellent pigment property, being capable of being easily dispersed in resins, and making it easy to carry out the blending operation. The regularly-shaped aluminosilicate comprises regularly-shaped sodium aluminosilicate particles obtained by firing a synthetic A or Pc zeolite, and has a nepheline or carnegieite crystalline structure, and further has an average particle diameter of from 0.5 to 30 μm, an apparent specific gravity of from 0.3 to 0.8 g/cm$^3$, an amount of oil absorption of not larger than 50 ml/100 g, a refractive index of from 1.46 to 1.56, and an amount of moisture absorption of smaller than 1% at a relative humidity of 90%.

8 Claims, 7 Drawing Sheets

REGULARLY-SHAPED ALUMINOSILICATE AND ITS USE

BACKGROUND OF THE INVENTION

1. Field of the Invention

The present invention relates to a regularly-shaped aluminosilicate. More specifically, the invention relates to a regularly-shaped aluminosilicate exhibiting excellent pigment property, being capable of being easily dispersed in a resin, enabling the blending operation to be favorably carried out, and useful as a blending agent for resins or for coating materials.

2. Prior Art

As a filler for various polymer films, resins or rubbers, it has been desired to develop an inorganic filler having a predetermined particle shape and which undergoes little secondary aggregation.

It has been known that zeolite has a predetermined particle shape and imparts antiblocking action when it is blended in a resin. According to, for example, Japanese Patent Publication No. 16134/1977, the anti-blocking property of a biaxially drawn film is improved by adding a zeolite powder having an average particle diameter of not larger than 20 microns in an amount of 0.01 to 5% by weight to a polypropylene.

Furthermore, Japanese Patent Publication No. 36866/1986 discloses an alumina-silica resin blending agent comprising primary cubic particles having a side of not longer than 5 microns and having an $Al_2O_3$:$SiO_2$ molar ratio of from 1:1.8 to 1:5, being substantially amorphous from the viewpoint of X-ray diffraction and having a BET specific surface area of not larger than 100 $m^2$/g.

Nepheline syenite which is a natural silicate is a mineral produced in Canada, and the powder obtained by finely pulverizing and classifying this mineral has been placed on the market under the trade name "Minex", and has been blended in resins (Japanese Laid-Open Patent Publication No. 234984/1990).

However, zeolite adsorbs the water (called zeolitic water). When a resin is blended with zeolite and is heated, therefore, the above-mentioned water is released giving rise to the occurrence of foaming. It has therefore been desired to provide an aluminosilicate blending agent which is inert and exhibits little adsorptive property.

The above-mentioned amorphous aluminosilicate resin blending agent comprises particles of a predetermined shape without containing base component of zeolite, causes the molded resin articles to be little colored, and exhibits small surface activity and adsorption compared to zeolite but yet exhibits hygroscopic property. When the blending agent after being left to stand under highly humid conditions is mixed into a resin, therefore, problems arise such as foaming, etc.

Furthermore, the product obtained by pulverizing and classifying the nepheline syenite, which is a naturally produced aluminosilicate mineral, is used as a blending agent for resins or coating materials because it exhibits a very small hygroscopic property.

However, the particles of the above product have indefinite shapes exhibiting a broad particle size distribution. Therefore, this blending agent is still not satisfactory for the purpose of accomplishing a desired anti-blocking property when blended in a relatively small amount. Moreover, the natural product contains many impurities leaving room for improvement from the standpoint of the quality of dispersion. Moreover, the particles have sharp corners specific to a mechanically pulverized product and exhibit abrasive properties.

It is therefore an object of the present invention to provide a regularly-shaped aluminosilicate having a predetermined composition and comprising regularly-shaped particles, and having a symmetrical particle size distribution, exhibiting low hygroscopic property and excellent pigment property.

Another object of the present invention is to provide a blending agent for resins or coating materials having a high pigment volume concentration, capable of being easily blended and dispersed in resins and in coating materials, and enabling the blending operation to be favorably carried out.

According to the present invention, there is provided a regularly-shaped aluminosilicate comprising cubic or spherical regularly-shaped particles having a chemical composition expressed by the following formula (1), $$mM_{2/x}O \cdot Al_2O_3 \cdot nSiO_2 \tag{2}$$

wherein m is a number of from 0.9 to 1.1, M is at least one of Na, K, Ca, Mg or Zn, x is a valency of M, and n is a number of from 1.9 to 3.6 and, preferably, from 1.9 to 3.4, and having a nepheline type or a carnegieite crystalline structure, said regularly-shaped particles having an apparent specific gravity of from 0.3 to 0.8 g/$cm^3$, an amount of oil absorption of not larger than 50 ml/100 g, a refractive index of from 1.46 to 1.56, and an amount of moisture absorption of not larger than 1% when the particles are exposed to an atmosphere of a relative humidity of 90% and a temperature of 20 to 25° C. for 48 hours.

The above-mentioned regularly-shaped aluminosilicate:

1. Is obtained by firing a synthetic A-type zeolite having an $SiO_2$/$Al_2O_3$ molar ratio of from 1.9 to 2.2 and particularly at a temperature of not lower than 800° C.;

2. Is obtained by firing a synthetic Pc-type zeolite having an $SiO_2$/$Al_2O_3$ molar ratio of from 2 to 3.6 and, particularly, from 2 to 3.4 at a temperature of not lower than 800° C.;

3. Has an average particle diameter of from 0.5 to 30 μm and, preferably, from 0.5 to 25 μm;

4. Has a sharpness (DP) of particle size distribution defined by the formula $D_{75}/D_{25}$, wherein $D_{25}$ represents a particle diameter at 25% of a cumulative particle size distribution on the volume basis as measured by a Coulter method, and $D_{75}$ represents a particle diameter at 75% thereof, of from 1.2 to 2.9; and 5. Has a Mohs' hardness of not larger than 6.

According to another embodiment of the present invention, there is provided a blending agent for resins, a blending agent for coating materials and a blending agent for crystalline glasses, comprising the above-mentioned regularly-shaped aluminosilicate.

DETAILED DESCRIPTION OF THE INVENTION

When fired at a high temperature, it has been known that the crystalline structure of zeolite changes into the nepheline type or the cargenieite type. However, it had not been considered that the nepheline or the cargenieite formed by the transition of zeolite was a useful substance.

The regularly-shaped aluminosilicate of the present invention has the nepheline type or carnegieite type crystalline structure, and has a feature in that it has a chemical composition represented by the above-mentioned formula (1) and a cubic or spherical regularly-shaped particle shape.

The chemical composition of the above-mentioned formula (1) corresponds to that of the A-type and Pc-type zeolites. The present invention has succeeded in synthesizing the cubic or spherical regularly-shaped nepheline or carnegieite particle by changing the crystalline structure of the A-type and Pc-type zeolites into the one of the nepheline type or the carnegieite type.

Figure 1:
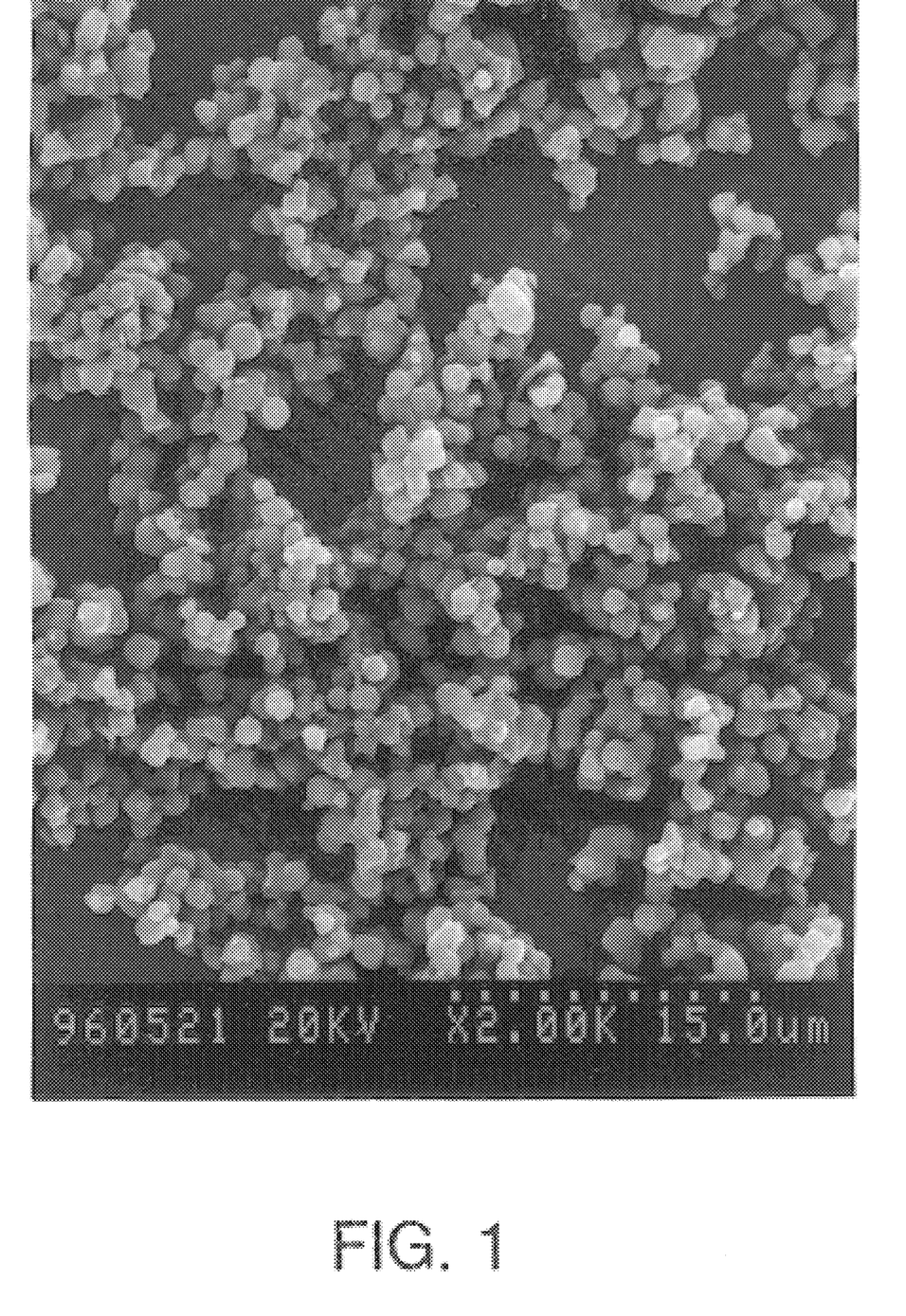
FIG. 1 is a scanning-type electron microphotograph showing the structure of regularly-shaped aluminosilicate particles of the present invention.
Figure 2:
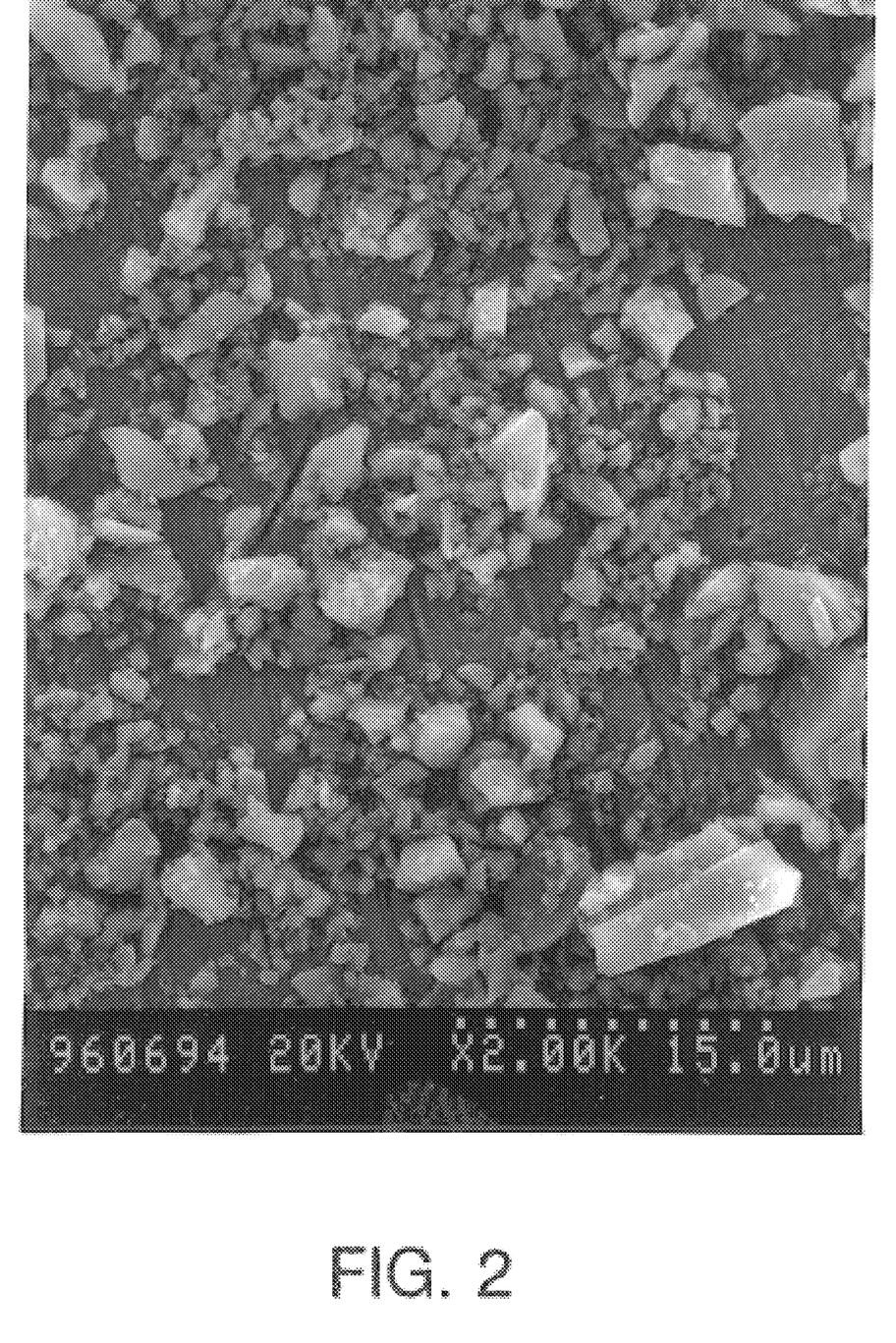
FIG. 2 is a scanning-type electron microphotograph showing the structure of conventional nepheline particles.

In the accompanying drawings, FIG. 1 is a scanning-type electron microphotograph showing the structure of regularly-shaped aluminosilicate particles of the present invention, and FIG. 2 is a scanning-type electron microphotograph showing the structure of the conventional nepheline particles. Comparison of these electron microphotographs shows that the conventional nepheline particles produced by pulverization are irregularly shaped and reveal abrasive shape resembling that of the fractured surfaces of a glass. Particle sizes are irregular, too. On the other hand, the regularly-shaped aluminosilicate of the present invention comprises cubic or spherical regularly-shaped particles, having symmetrical particle sizes.

Though there is no particular limitation, the regularly-shaped aluminosilicate particles of the present invention have an average particle diameter (median diameter on the volume basis) of, generally, from 0.1 to 30 $\mu$m and, particularly, from 0.5 to 25 $\mu$m. The sharpness (DP) of particle size distribution of the known nepheline syenite is, usually, not smaller than 3. However, the sharpness DP of the regularly-shaped aluminosilicate of the present invention is, usually, from 1.2 to 2.9, exhibiting a symmetrical particle size distribution. Therefore, the powder exhibits good fluidity and disperses well in resins and in coating materials.

Figure 3:
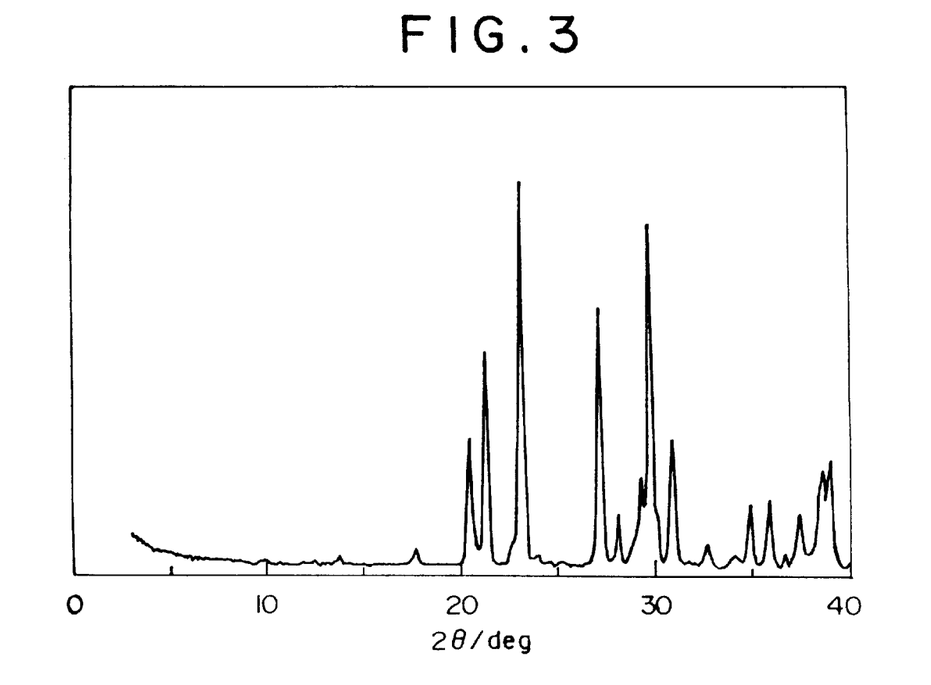
FIG. 3 shows an X-ray diffraction image of a regularly-shaped aluminosilicate (nepheline) of the present invention.
Figure 4:
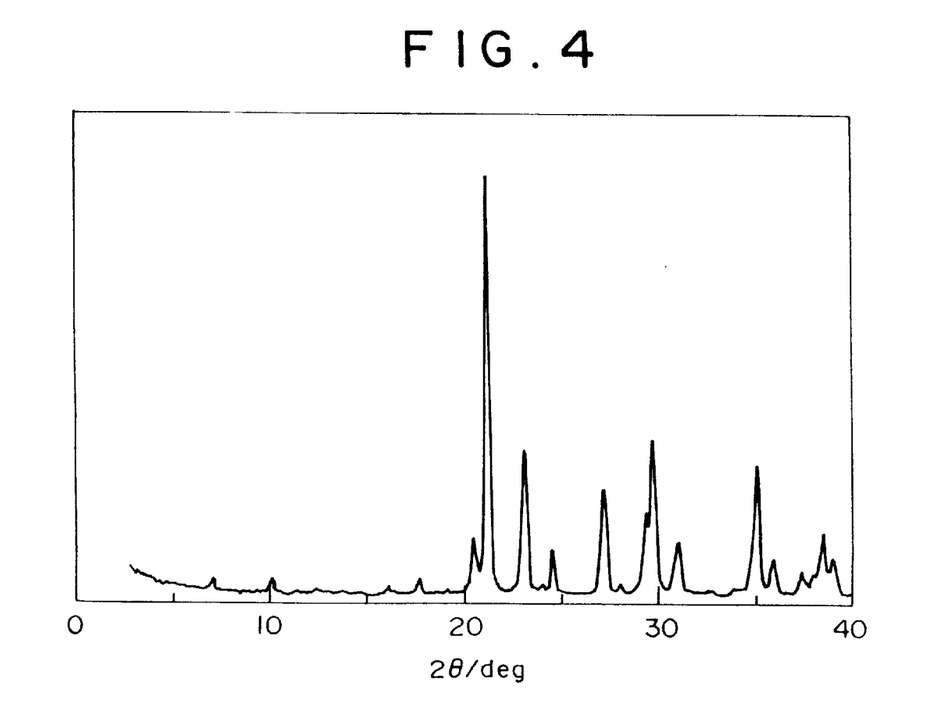
FIG. 4 shows an X-ray diffraction image of another regularly-shaped aluminosilicate (carnegieite) of the present invention.
Figure 5:
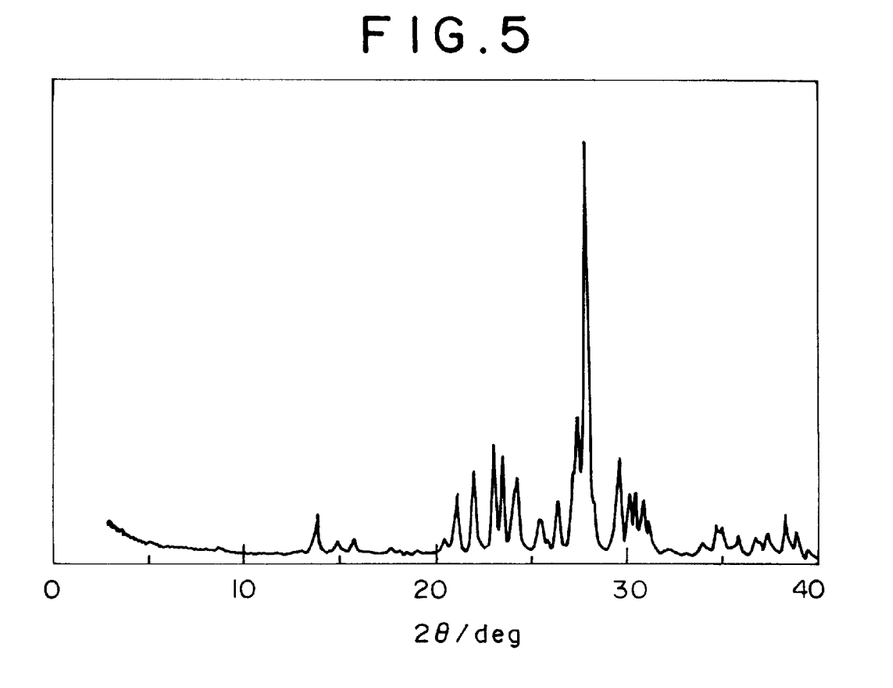
FIG. 5 shows an X-ray diffraction image of a conventional nepheline syenite which is a natural mineral produced in Canada.

FIG. 3 shows an X-ray diffraction image of a regularly-shaped aluminosilicate (nepheline) of the present invention, FIG. 4 shows an X-ray diffraction image of another regularly-shaped aluminosilicate (carnegieite) of the present invention, and FIG. 5 shows an X-ray diffraction image of a known nepheline syenite. The X-ray diffraction image of FIG. 3 corresponds to peaks of nephelines ICDD19-1176, 33-1203, 35-424, the X-ray diffraction image of FIG. 4 corresponds to peaks of carnegieites ICDD11-220, 11-221, whereas the known naturally produced mineral contains many impurities as shown in FIG. 5. Therefore, the resins or the like blended with the regularly-shaped aluminosilicate of the present invention are not affected by impurities.

The regularly-shaped aluminosilicate of the present invention is fired to acquire crystals of the nepheline type or the carnegieite type, has an apparent specific gravity which is quite dense as from 0.3 to 0.8 and, particularly, from 0.4 to 0.6 g/cm$^3$, and exhibits such an excellent pigment property that the amount of oil absorption is not larger than 50 ml/100 g. Therefore, the regularly-shaped aluminosilicate of the present invention can be easily mixed into resins or coatings, offering excellent operability.

Furthermore, the regularly-shaped aluminosilicate of the invention has a refractive index of from 1.46 to 1.56, which is close to the refractive index of resins. Therefore, a resin blended with the regularly-shaped aluminosilicate does not lose transparency. When used as a body (extender pigment), furthermore, a clear coating material does not lose its clarity.

The regularly-shaped aluminosilicate of the present invention has a very small hygroscopic property and absorbs moisture in an amount of not larger than 1% when it is exposed to the atmosphere of a relative humidity (RH) of 90% and a temperature of 20 to 25° C. for 48 hours. Therefore, the resins blended with the regularly-shaped aluminosilicate do not develop a problem of foaming and require no countermeasure against the humidity prior to the blending.

The regularly-shaped aluminosilicate of the present invention can be produced by firing a synthetic A-type or Pc-type zeolite at a temperature of, usually, not lower than 800° C.

The A-type and Pc-type zeolite particles serving as starting materials have been widely known, and preferably have a chemical composition lying within a range of the above-mentioned formula (1).

Though there is no particular limitation, the A-type zeolite which is the starting material is synthesized by mixing, for example, sodium silicate or a gel of active silicic acid, sodium aluminate and sodium hydroxide to form a gel of alkali aluminosilicate satisfying the following conditions:

| Component ratio | Molar ratio |
| --- | --- |
| Na$_2$O/SiO$_2$ | 0.06 to 3.4 |
| SiO$_2$/Al$_2$O$_3$ | 0.8 to 18 |
| H$_2$O/Na$_2$O | 4 to 300 | homogenizing the gel, and crystallizing the gel at a temperature of from 80 to 200° C. under normal pressure or under a hydrothermal condition.

According to the present invention, furthermore, the starting Pc-type zeolite is synthesized having an SiO$_2$/Al$_2$O$_3$ molar ratio of as low as from 2 to 3.6. A preferred Pc-type zeolite has the following composition:

| | |
| --- | --- |
| SiO$_2$ | 50 to 40% by weight |
| Al$_2$O$_3$ | 23 to 35% by weight |
| Na$_2$O | 15 to 19% by weight |

The Pc-type zeolite is synthesized by mixing sodium silicate or a gel of active silicic acid, sodium aluminate and sodium hydroxide to form a gel of alkali aluminosilicate satisfying the following conditions:

| Component ratio | Molar ratio | Preferably Molar ratio |
| --- | --- | --- |
| Na$_2$O/SiO$_2$ | 0.2 to 8 | 0.5 to 2 |
| SiO$_2$/Al$_2$O$_3$ | 2 to 3.7 | 2.5 to 3.1 |
| H$_2$O/Na$_2$O | 20 to 200 | 30 to 100 |

To prevent A-type zeolite and X-type zeolite from being by-produced, it is important that the reaction is carried out under normal pressure or under a hydrothermal condition at a temperature of not lower than 80° C. and, particularly, from 80 to 200° C. with vigorous stirring to accomplish the crystallization under a homogeneous condition. This makes it possible to synthesize the Pc-type zeolite in a pure form.

Prior to the firing, it is desired that free alkalis of the formed A-type and Pc-type zeolites are washed away to a sufficient degree or are treated with an acid to a slight degree, in order to remove free alkali components as much as possible.

To produce regularly-shaped aluminosilicates other than the one of the Na-type, the zeolite of the A-type or the Pc-type obtained by the above-mentioned method is brought into contact with an aqueous solution of a water-soluble salt of K, Ca, Mg or Zn to exchange ions. Water-soluble salts may be used inorganic salts such as chloride, nitrate or sulfate, or organic salts such as acetate and toluene sulfonate. It is desired that ion exchange is effected by using a water-soluble salt in excess of an equivalent amount at a temperature of from room temperature to 90° C. When the ion exchange treatment is effected under a heated condition, an advantage is obtained in that the rate of exchange is enhanced.

The A-type and Pc-type zeolites are fired at a temperature of not lower than 800° C. and, particularly, from 800 to 1500° C. The crystalline structure of the product differs depending upon the firing temperature. In the case of the A-type zeolite, carnegieite is formed at a temperature of about 800° C., nepheline is formed at a temperature not lower than 850° C., and carnegieite is formed again at a temperature not lower than 1300° C.

Figure 6:
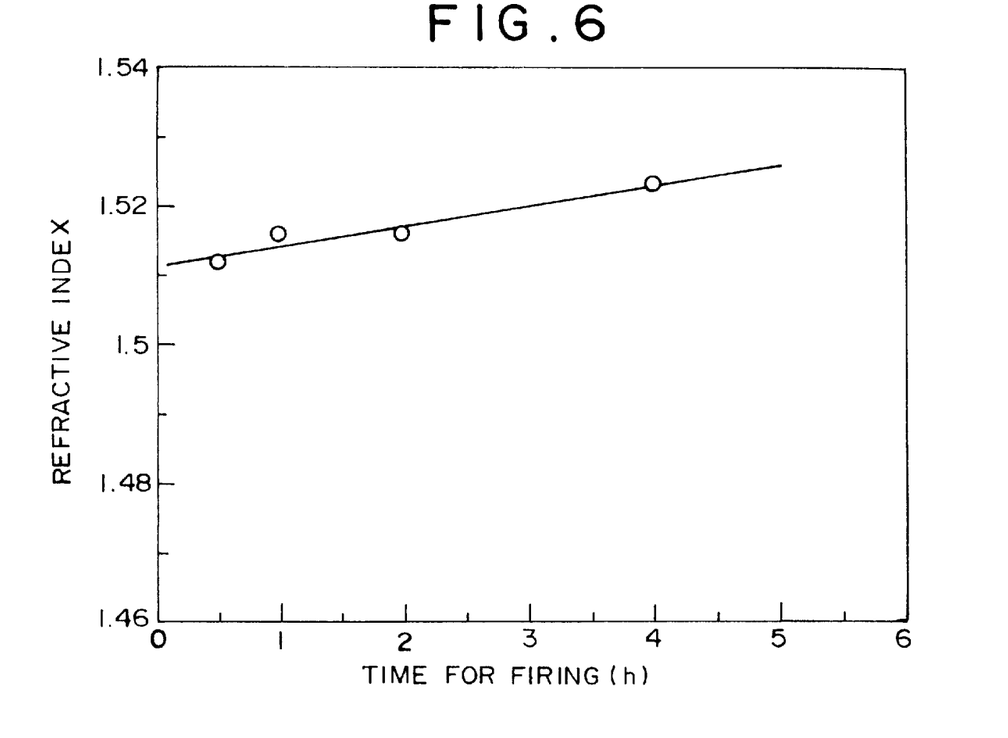
FIG. 6 is a diagram showing the time for firing the A-type zeolite of Example 1 at 900° C. and the refractive index.

The firing can be accomplished by using a firing furnace of the fixed bed type, moving bed type or fluidized type. The source of heat will be various combustible gases, infrared rays, etc. The firing time will be usually from about 0.5 to about 4 hours though it may vary depending upon the type of the furnace and the type of the crystals. FIG. 6 shows a change in the refractive index with a change in the firing time when the A-type zeolite (sample No. AZ-1) of Example 1 appearing later is fired in an electric furnace at 900° C.

It was found that the regularly-shaped particles of the nepheline type or the carnegieite type obtained by firing have a symmetrical particle size distribution compared with that of the A-type and Pc-type zeolite particles. The reason is attributed that the fine particles contained therein are sintered, though contraction of the zeolite particles may also be one of the factors.

As required, the thus formed regularly-shaped aluminosilicate is subjected to such treatments as pulverization, classification, etc., and are used as a blending agent for resins, coating materials or crystalline glasses.

As required, furthermore, the regularly-shaped aluminosilicate particles are subjected to various after-treatments and surface treatments.

When the product is strongly alkaline, for example, the product is washed with water or is treated with an acid to a slight degree to adjust the pH at the time when it is being dispersed in the water. It is desired that a 5% aqueous suspension of the regularly-shaped aluminosilicate has a pH of from 8 to 11.

Acid that is used may be either inorganic acid or organic acid without any particular limitation. From the economical point of view, however, it is desired to use a mineral acid such as hydrochloric acid, sulfuric acid, nitric acid or phosphoric acid.

According to the present invention, the surfaces of the regularly-shaped aluminosilicate particles may be coated with fatty acid, metal soap, resin acid soap, various resins or waxes, coupling agent of the silane type, titanium type or zirconium type, or silica coating, as desired.

Though generally not required, it is also allowable, as desired, to apply at least one of a metal component selected from the group consisting of alkali metal, alkaline earth metal, Ti, Zr, Al and Zn to reform the surface of the amorphous regularly-shaped particles. Upon reforming the surface, furthermore, the refractive index of the product of the present invention can be adjusted, and the product can be blended to meet the refractive index of the resin. For example, the surfaces can be coated or treated with titanium oxide, silicon oxide, zirconium oxide, zinc oxide, barium oxide, magnesium oxide, or calcium oxide.

The regularly-shaped aluminosilicate of the present invention can be added, as a resin blending agent, to various resins such as olefin resins like polypropylene, polyethylene, crystalline propylene-ethylene copolymer, ionically crosslinked olefin copolymers, and ethylene-vinyl acetate copolymer; thermoplastic polyesters like polyethylene terephthalate and polybutylene terephthalate; polyamides such as 6-nylon, 6,6-nylon; chlorine-contained resins like vinyl chloride resin and vinylidene chloride resin; polycarbonates; polysulfones; and polyacetals, in order to impart slipping property or antiblocking property to the molded resin articles, e.g., to the biaxially drawn films. It is also allowable to use the regularly-shaped aluminosilicate of the present invention as a filler for increasing the weight of the molded resin articles, for adjusting the hardness, for increasing the strength, and for imparting heat resistance.

A preferred thermoplastic resin blended with the regularly-shaped aluminosilicate as an anti-blocking agent will be an olefin resin. Its examples include low-, medium- or high-density polyethylene, isotactic polypropylene, syndiotactic polypropylene, or a polypropylene copolymer which is a copolymer with these ethylene or α-olefin, linear low-density polyethylene, ethylene-propylene copolymer, polybutene-1, ethylene-butene-1 copolymer, propylene-butene-1 copolymer, ethylene-propylene-butene-1 copolymer, ethylene-vinyl acetate copolymer, tonically crosslinked olefin copolymer (ionomer), and ethylene-acrylic ester copolymer, which may be used alone or in the form of a blend of two or more kinds.

The olefin polymers may be produced by using a so-called Ziegler catalyst comprising a halogen-containing transition metal compound and an organoaluminum compound, or by using a so-called metallocene catalyst, i.e., a catalyst comprising a cyclopentadienyl skeleton-containing complex of a transition metal such as titanium or zirconium and an organoaluminoxane compound.

The amount of addition to the resin is suitably selected over a range of, generally, from 0.01 to 100 parts by weight per 100 parts by weight of the resin, though it may differ depending upon the use.

As required, the olefin resin composition is blended with antioxidant, heat stabilizer, light stabilizer, lubricant, antistatic agent, defogging agent, neutralizing agent (halogen catcher), nucleating agent, heat-ray absorber, etc. Here, the blending agent for resins of the present invention is neutral, and is inert to other resin blending agents, and does not decompose them, does not impart color, does not impair properties of other resin blending agents, or does not deteriorate properties of the resin.

Examples of the antioxidant include phenolic antioxidants such as 2,6-di-t-butyl-4-methylphenol, tris(3,5-di-t-butyl-4-hydroxybenzyl) isocyanurate (Irganox 3114 produced by Chiba Geigy Co.), 2,2'-methylenebis(4-ethyl-6-t-butylphenol), n-octadecyl-3-(3',5'-di-t-butyl-4'-hydroxyphenyl) propionate (Irganox 1076 produced by Chiba Geigy Co.), 4,4'-thiobis(3-methyl-6-t-butylphenol), tetrakis[methylene-3-(3',5'-di-t-butyl-4'-hydroxyphenyl) propionate] methane (Irganox 1010 produced by Chiba Geigy Co.), 4,4'-butylidenebis(3-methyl-6-t-butylphenol), 2,2'-methylenebis(4-methyl-6-t-butylphenol), N,N'hexamethylenebis(3,5-di-t-butyl-4-hydroxyhydrocynnamide) (Irganox 1098 produced by Chiba Geigy Co.), triethylene glycolbis[3-(3'-t-butyl-5'-methyl-4-hydroxyphenyl) propionate], and a mixture of bis(3,5-di-t-butyl-4-hydroxybenzyl ethyl phosphonate) calcium and PE wax (weight ratio of 1:1).

It is desired that the phenol antioxidant is added in an amount of from 0.01 to 0.3 parts by weight per 100 parts by weight of the resin. When the amount is smaller than the above range, the antioxidizing effect is not exhibited. When the amount exceeds 0.3 parts by weight, the resin is colored yellow after being stored for extended periods of time, or bleeding occurs on the film surface to impair transparency or to impair blocking property.

Examples of the phosphorus type antioxidant include trimethyl phosphite, tri-n-butyl phosphite, tridecyl phosphite, tris(2-ethylhexyl) phosphite, trinonyl phosphite, tricetyl phosphite, dilaurylhydrogen phosphite, tricyclohexyl phosphite, triphenyl phosphite, tribenzyl phosphite, tricresyl phosphite, tri-p-nonylphenyl phosphite, diphenyldecyl phosphite, tris(dinonylphenyl) phosphite, tris(2,4-di-t-butylphenyl) phosphite, tris(4-α-methylbenzylphenyl) phosphite, tris(octylthioethyl) phosphite, tris (octylthiopropyl) phosphite, tris(cresylthiopropyl) phosphite, tris(3,5-di-t-butyl-4-hydroxyphenyl) phosphite, tetraphenyldipropylene glycol disphosphite, 4,4'-butylidenebis(3-methyl-6-t-butylphenyl-ditridecyl) phosphite, 1,1,3-tris(2-methyl-4-ditridecyl phosphite-5-t-butylphenyl) butane, bis(2-chloropropyl) pentaerythritol diphosphathio, bisphenylpentaerythritol diphosphite, bis-stearylpentaerythritol diphosphite, trilauryltrithio phosphite, tetrakis(2,4-di-t-butylphenyl) 4,4'-biphenylene diphosphite, etc.

It is desired that the phosphorus type antioxidant is added in an amount of from 0.01 to 0.2 parts by weight per 100 parts by weight of the resin. When the amount of addition is smaller than the above range, the effect for preventing oxidation and the effect for preventing the resin from turning yellow are not exhibited. When the amount of addition exceeds 0.3 parts by weight, black specks and corrosion of metal may increase.

Any lubricant used for the polyolefin films can be used for improving the workability of the resin composition. Examples of the lubricant include (a) those of the hydrocarbon type such as fluidizing, natural or synthetic paraffin, microwax, polyethylene wax, and chlorinated polyethylene wax, (b) those of the fatty acid type such as stearic acid, lauric acid, (c) palmitic acid amide, esylic acid amide, methylenebis stearoamide, ethylenebis stearoamide, erucic acid amide, stearic acid amide, oleic acid amide, behenic acid amide, N-stearyl butyric acid amide, N-stearyl caprylic acid amide, N-stearyl lauric acid amide, N-stearyl stearic acid amide, N-stearyl behenic acid amid, N-oleyl oleic acid amide, N-oleyl behenic acid amide, N-butyl erucic acid amide, N-octyl erucic acid amide, N-lauryl erucic acid amide, ethylenebis oleic acid amide, hexamethylenebis oleic acid amide, N,N'-dioleyl adipic acid amide, and N,N'-dioleyl sebacic acid amide, etc. (d) those of the ester type such as butyl stearate, cured castor oil, and ethylene glycol monostearate, (e) those of the alcohol type such as cetyl alcohol and stearyl alcohol, (f) metal soaps such as lead stearate, calcium stearate, and (g) a mixture thereof. Particularly, however, fatty acid monoamide or bisamide is preferably used.

It is desired that the lubricant and, particularly, the fatty acid amide type lubricant is used in an amount of from 0.01 to 0.3 parts by weight per 100 parts by weight of the resin. When the amount is smaller than the above-mentioned range, slipping property is not imparted. When the amount is larger than the above-mentioned range, the film surface is whitened due to bleeding and transparency is lost.

The regularly-shaped aluminosilicate of the present invention can be mixed into various coating materials (paints etc.) as a blending agent such as a body (extender pigment), a rheology-adjusting agent, a delustering agent, etc.

From the kind of the resins, there can be exemplified widely used and known coating materials such as oil coating material, nitrocellulose coating material, alkyd resin coating material, aminoalkyd coating material, vinyl resin coating material, acrylic resin coating material, epoxy resin coating material, polyester resin coating material and chlorinated rubber coating material, as well as coating materials containing one or two or more kinds of rosin, ester gum, pentaresin, cumarone-indene resin, phenolic resin, modified phenolic resin, maleic resin, alkyd resin, amino resin, vinyl resin, petroleum resin, epoxy resin, polyester resin, styrene resin, acrylic resin, silicone resin, rubber base resin, chloride resin, urethane resin, polyamide resin, polyimide resin, fluorine-contained resin, and natural or synthetic Japanese lacquer. These coating materials may be used in one or two or more kinds.

Any coating material can be used depending upon the use, such as solvent type coating material, aqueous coating material, ultraviolet-ray curing coating material or powdery coating material.

Organic solvent for the solution type coating material will be aromatic hydrocarbon type solvent such as toluene or xylene; aliphatic hydrocarbon type solvent such as n-heptane, n-hexane or isomer; alicyclic hydrocarbon type solvent such as cyclohexane; ketone type solvent such as acetone, methyl ethyl ketone, methyl isobutyl ketone, or cyclohexanone; alcohol type solvent such as ethanol, propanol, butanol or diacetone alcohol; ether type solvent such as tetrahydrofurane or dioxane; cellosolve type solvent such as ethyl cellosolve or butyl cellosolve; ester type solvent such as ethyl acetate or butyl acetate; and nonprotonic polar solvent such as dimethyl formamide, dimethyl acetamide, or dimethyl sulfoxide, which may be used in one or two or more kinds. It is desired that the resin component concentration in the starting material solution is, usually, from 5 to 70% by weight and, particularly, from 10 to 60% by weight.

As the aqueous coating material, there can be further used a self-emulsifying or surfactant-emulsifying coating material in addition to the solution type coating material. As the resin for the aqueous coating material, there can be used an alkyd resin, a polyester resin, an acrylic resin or an epoxy resin which is dissolved in an aqueous medium or is self-emulsified, being used alone or in a combination of two or more kinds. In the self-emulsifying resin, the carboxyl group is neutralized with ammonia or amines, or the amine contained therein is quaternalized to impart self-emulsifying property. There are further used various latex resins. It is desired that the resin component concentration is, usually, from 10 to 70% by weight and, particularly, from 20 to 60% by weight.

As the ultraviolet-ray (UV) curing coating material, there can be used a high-solid resin, e.g., UV-curing acrylic resin, epoxy resin, vinyl urethane resin, acrylic urethane resin or polyester resin in a single kind or in a combination of two or more kinds.

As the powdery coating material, there can be used a thermoplastic resin such as polyamide, polyester, acrylic resin, olefin resin, cellulose derivatives, polyether or vinyl chloride resin, as well as epoxy resin, epoxy/novolak resin, isocyanate or epoxy-curing polyester resin.

According to the present invention, the regularly-shaped aluminosilicate has a pigment volume concentration (PVC) as represented by the following formula, $$PVC = \frac{100B\rho}{B\rho + 0.01OrP\rho}$$

wherein Or is an amount of oil absorption (ml/100 g) of the pigment, P$\rho$ is a density (g/ml) of the pigment, and B$\rho$ is a density (g/ml) of the resin (vehicle),
of as high as 40 to 60% and can, hence, be contained at a high concentration as a body (extender pigment) in the coating materials or as a filler in the resin molded articles.

The crystalline glass is heat-treated to precipitate crystals of the nepheline type or the cargenieite type. When the glass composition is blended with the regularly-shaped aluminosilicate particles of the present invention in advance, the crystals can be easily precipitated or the precipitation can be controlled.

The regularly-shaped aluminosilicate of the present invention can be extensively used as an additive not only for the crystalline glasses but also for wide range of glasses and can further be used, for example, as a ceramic substrate.

EXAMPLES

The invention will now be described by way of Examples.

(EXAMPLE 1)

Described below is a method of preparing a blending agent for resins and a blending agent for coating materials, comprising a fine powder of a regularly-shaped aluminosilicate (nepheline type, carnegieite type) having low hygroscopic property and a high particle size symmetry of the present invention.
(Preparation of a regularly-shaped aluminosilicate and its properties)

The A-type zeolite particles of a cubic or a spherical regular shape having a molar ratio $SiO_2/Al_2O_3=2$ of the starting material of the present invention were prepared by using a sodium silicate aqueous solution ($SiO_2=22\%$ by weight, $Na_2O=7.2\%$ by weight) prepared from the cullet of sodium silicate, a sodium aluminate aqueous solution ($Al_2O_3=25\%$ by weight, $Na_2O=19\%$ by weight) and sodium hydroxide.

The sodium silicate solution and the sodium aluminate solution were slowly mixed together with stirring under the following molar composition conditions so that the total amount of the reaction solution was 5 kg in a 20-liter stainless steel container, in order to form a sodium aluminosilicate gel which as a whole was homogeneous.

$Na_2O/SiO_2=1$ to 1.5
$SiO_2/Al_2O_3=2$ to 2.5
$H_2O/Na_2O=70$

Next, the gel was vigorously stirred to form regularly-shaped particles of the A-type zeolite crystals at a temperature of 80 to 95° C. for about 2 hours, followed by filtration and washing to remove free alkali components, thereby to obtain a cake-like product (AZH) containing about 30% of water. Part of the product was dried at 110° C. (sample No. AZ-1).

Then, the AZH was fired in an electric furnace at 900° C. for 2 hours, and was dry-pulverized using a ball mill (sample No. NP-1, nepheline type). Part of this product was further wet-pulverized, and to which was added stearic acid in an amount of 1% per the solid content. The mixture was heated at 80° C. and was stirred for one hour, followed by filtration, washing with water, drying at 100° C., and was pulverized using a small sample mill and was classified (sample No. NP-2, nepheline type).

The AZH was further fired at 700° C., 800° C., 1000° C. and 1400° C., respectively, to obtain products in the same manner as the sample No. NP-1 (sample No. NP-3, A-type zeolite; NP-4, carnegieite type; NP-5, nepheline type, NP-6, carnegieite type). NS is a nepheline syenite produced in Canada which has heretofore been placed in the market, and serves as Comparative Example for assisting the comprehension of the present invention.

The product obtained by the way that the AZH that is partly fired at 900° C. after it was washed with 5% sulfuric acid also comprises favorable regularly-shaped particles of the nepheline type satisfying the object of the present invention. As a Reference Example, the AZH was prepared in the form of a water-dispersed slurry, and about one-half the sodium in the zeolite was subjected to the ion exchange treatment with a calcium chloride aqueous solution and a magnesium chloride aqueous solution followed by firing to obtain a regularly-shaped aluminosilicate having lowly hygroscopic property.

(EXAMPLE 2)

The A-type zeolite which is the starting material of the present invention was synthesized by using a sodium silicate aqueous solution ($SiO_2=22\%$ by weight, $Na_2O=7.2\%$ by weight) prepared from the cullet of sodium silicate, a sodium aluminate aqueous solution ($Al_2O_3=25\%$ by weight, $Na_2O=19\%$ by weight) and sodium hydroxide.

The sodium silicate solution and the sodium aluminate solution were mixed together under the following molar composition conditions so that the total amount of the reaction solution was 5 kg in a 20-liter stainless steel container, in order to form a homogeneous sodium aluminosilicate gel.

$Na_2O/SiO_2=1.6$
$SiO_2/Al_2O_3=1.8$
$H_2O/Na_2O=120$

Next, the gel was crystallized being heated at 85° C. for about 24 hours, and was then filtered, washed and dried at 110° C. to obtain the A-type zeolite (sample No. AZ-2).

Then, the AZ-2 was fired in a muffle furnace FR-41 manufactured by Yamato Co. at 900° C. for 2 hours and was wet-pulverized using a ball mill, filtered, washed with water, dried at 110° C., and was pulverized. There was thus obtained a regularly-shaped aluminosilicate powder having a cubic particle shape maintaining excellent particle size symmetry (sample No. NP-7).

Furthermore, the sample AZ-2 was fired at 800° C. (sample No. NP-9, nepheline type).

The results were as shown in Table 1.

(EXAMPLE 3)

The A-type zeolite which is the starting material of the present invention was synthesized by using a sodium silicate aqueous solution ($SiO_2$=22% by weight, $Na_2O$=7.2% by weight) prepared from the cullet of sodium silicate, a sodium aluminate aqueous solution ($Al_2O_3$=25% by weight, $Na_2O$=19% by weight) and sodium hydroxide.

The sodium silicate solution and the sodium aluminate solution were mixed together under the following molar composition conditions so that the total amount of the reaction solution was 5 kg in a 20-liter stainless steel container, in order to form a homogeneous sodium aluminosilicate gel.

$Na_2O/SiO_2$=1.6
$SiO_2/Al_2O_3$=1.8
$H_2O/Na_2O$=120

Next, the gel was crystallized being heated at 95° C. for about 24 hours, and was then filtered, washed and dried at 110° C. to obtain the A-type zeolite (sample No. AZ-3).

Then, the AZ-3 was fired in a muffle furnace FR-41 manufactured by Yamato Co. at 900° C. for 2 hours and was wet-pulverized using a ball mill, filtered, washed with water, dried at 110° C., and was pulverized. There was thus obtained a regularly-shaped aluminosilicate powder having a cubic particle shape maintaining excellent particle size symmetry (sample No. NP-8).

Figure 7:
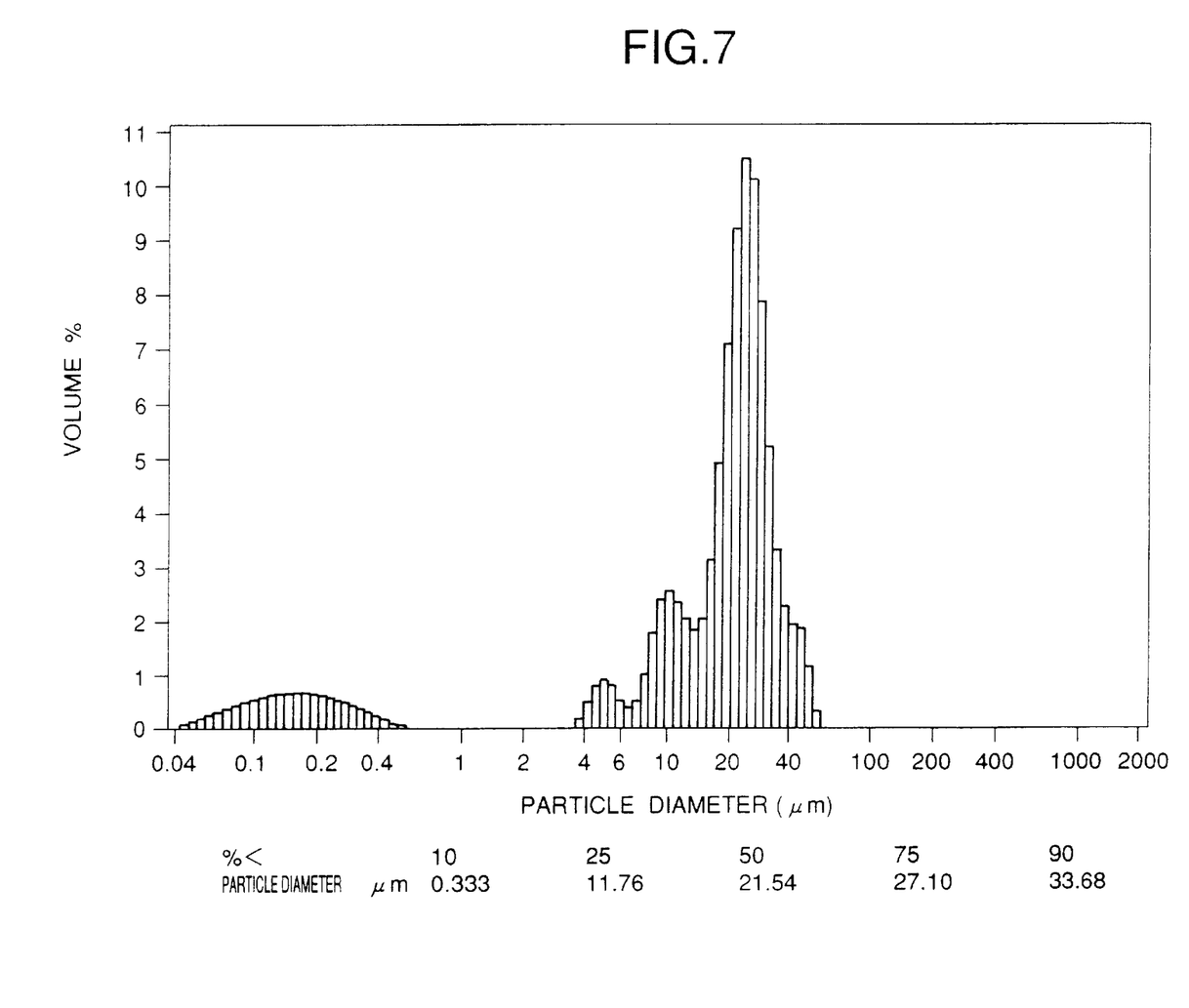
FIG. 7 is a diagram of particle size distribution of the A-type zeolite (sample No. AZ-3) of Example 3.
Figure 8:
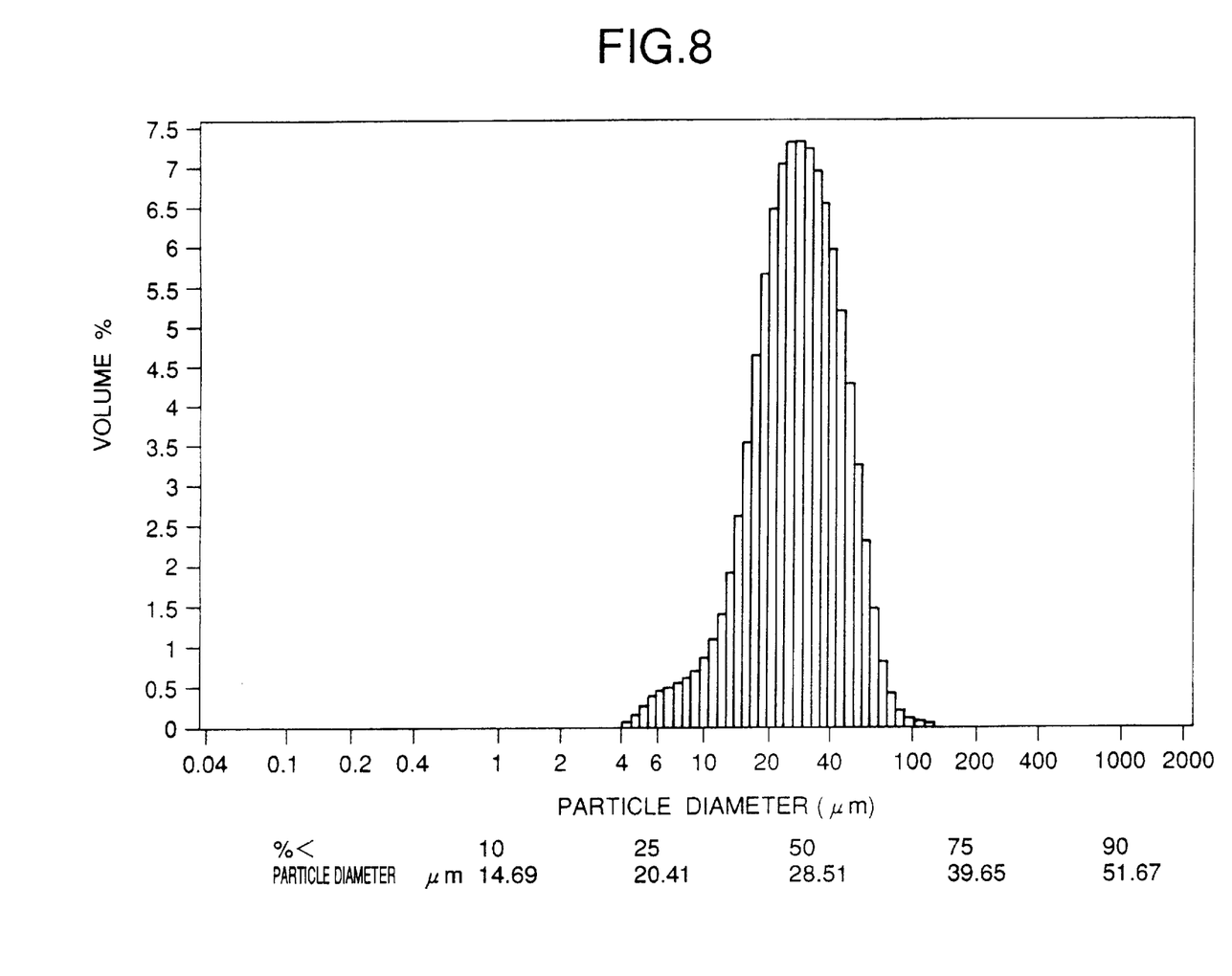
FIG. 8 is a diagram of a particle size distribution of a regularly-shaped aluminosilicate (sample No. NP-8) obtained in Example 3.
Figure 9:
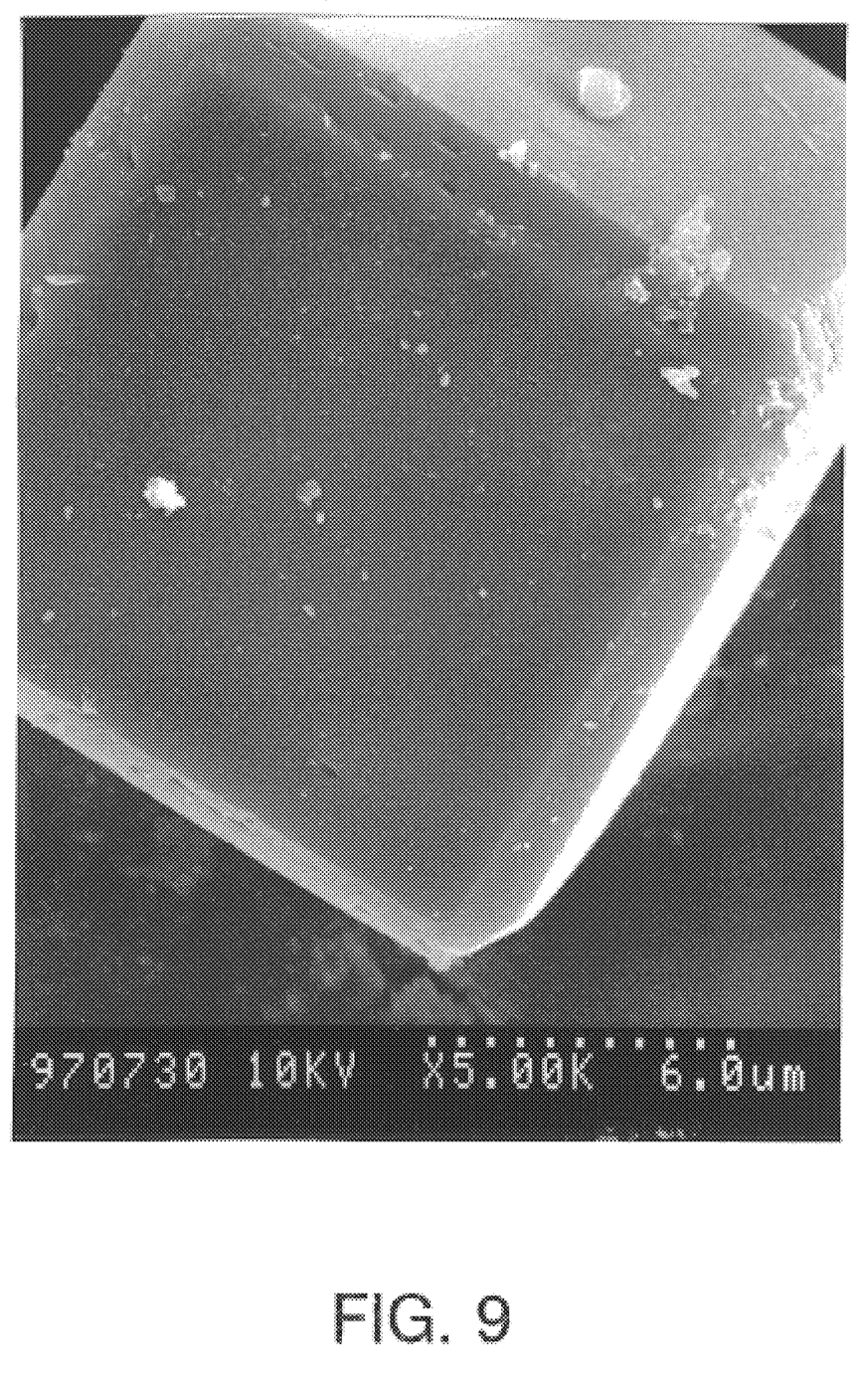
FIG. 9 is a scanning-type electron microphotograph (magnification of 5000 times) showing the particle structure of the regularly-shaped aluminosilicate (sample No. NP-8) obtained in Example 3.

The results were as shown in Table 1 and in FIGS. 7 and 8. FIG. 9 is its electron microphotograph.

(EXAMPLE 4)

Described below are a method of preparing spherical Pc-type zeolite particles having rugged surfaces of a low $SiO_2/Al_2O_3$ composition ratio of the present invention by using a sodium silicate solution in which is dissolved the cullet of sodium silicate ($SiO_2$=22% by weight, $Na_2O$=7.2% by weight), a sodium aluminate ($Al_2O_3$=25.3% by weight, $Na_2O$=19.1% by weight) and caustic soda.

The sodium aluminate solution was heated at 90° C. and was stirred, and to which was mixed the sodium silicate solution heated at 75° C. over a period of 12 minutes (maintaining the temperature of not lower than 80° C.) so that the total amount of the reaction solution was 5 kg in a 10-liter stainless steel container, in order to form a wholly homogeneous gel-like sodium aluminosilicate having the following molar composition.

$Na_2O/SiO_2$=1.0
$SiO_2/Al_2O_3$=3.0
$H_2O/Na_2O$=70

Then, the gel was vigorously stirred, heated at 95° C. for about 12 hours to prepare spherical Pc-type zeolite particles of the present invention, followed by filtration, washing and drying at 110° C. (sample PZ-1).

Then, the PZ-1 was fired in the muffle furnace FR-41 manufactured by Yamato Co, at 900° C. for one hour, and was then pulverized (example No. NP-10).

(EXAMPLE 5)

The same starting materials as those of Example 1 were used. That is, the sodium aluminate solution was heated at 90° C. and was stirred, and to which was mixed the sodium silicate solution heated at 80° C. over a period of about 4 minutes so that the total amount of the reaction solution was 1.75 kg in a 2-liter stainless steel container, in order to form a wholly homogeneous gel-like sodium aluminosilicate having the following molar composition.

$Na_2O/SiO_2$=1.71
$SiO_2/Al_2O_3$=2.52
$H_2O/Na_2O$=44

Then, the gel was vigorously stirred, heated at 90° C. for about 6 hours followed by filtration, washing with water and drying, to prepare spherical Pc-type zeolite particles of the present invention (sample No. PZ-2). The $SiO_2/Al_2O_3$ molar ratio was 2.25. Hereinafter, the procedure was carried out in the same manner as in Example 4 (sample No. NP-11).

(EXAMPLE 6)

The same starting materials as those of Example 1 were used. That is, the sodium aluminate solution was heated at 90° C. and was stirred, and to which was mixed the sodium silicate solution heated at 75° C. over a period of 12 minutes (maintaining a temperature of not lower than 80° C.) so that the total amount of the reaction solution was 5 kg in a 10-liter stainless steel container, in order to form a wholly homogeneous gel-like sodium aluminosilicate having the following molar composition.

$Na_2O/SiO_2$=0.85
$SiO_2/Al_2O_3$=4.00
$H_2O/Na_2O$=70

Then, the gel was vigorously stirred, heated at 95° C. for about 20 hours followed by filtration, washing with water and drying, to prepare a cake, which was then pulverized to obtain a spherical Pc-type zeolite particles of the present invention (sample No. PZ-3). The sample possessed the $SiO_2/Al_2O_3$ molar ratio of 3.19. Hereinafter, the procedure was carried out in the same manner as in Example 4 (sample No. NP-12).

(EXAMPLE 7)

The same starting materials as those of Example 1 were used. That is, the sodium aluminate solution was heated at 90° C. and was stirred, and to which was mixed the sodium silicate solution heated at 75° C. over a period of 12 minutes (maintaining a temperature of not lower than 80° C.) so that the total amount of the reaction solution was 5 kg in a 10-liter stainless steel container, in order to form a wholly homogeneous gel-like sodium aluminosilicate having the following molar composition.

$Na_2O/SiO_2$=0.70
$SiO_2/Al_2O_3$=6.00
$H_2O/Na_2O$=60

Then, the gel was vigorously stirred, heated at 95° C. for about 20 hours followed by filtration and washing with water to prepare a Pc-type zeolite cake.

Next, water was added to the cake to prepare a slurry of a concentration of 20%, which was then heated at 40° C. and was stirred. Then, calcium chloride was added thereto in an amount of 1.0 mol times of the $Na_2O$ component contained in the Pc-type zeolite and was held for one hour. Thereafter, the slurry was filtered, washed with water, dried at 110° C., and was pulverized (sample No. PZ-4). The sample possessed the $SiO_2/Al_2O_3$ molar ratio of 3.50. Hereinafter, the procedure was carried out in the same manner as in Example 4 (sample No. NP-13).

Measuring method
(1) X-ray analysis of the powder.
Measured by using a Geiger-Flex RAD-1B system manufactured by Rigaku Co., under the following conditions:

| | |
|---|---|
| Target | Cu |
| Filter | Ni |
| Tube voltage | 35 kV |
| Tube current | 15 mA |
| Count full-scale | 10 kcps |
| Scanning speed | 4 deg/min. |
| Time constant | 0.5 sec. |
| Slit DS (SS) | 1 deg RS 0.3 mm |

(2) Average particle diameter.
The average particle diameter was found on the volume basis by using the Particle size analyzer, LS-230, produced by Coultar Co.
(3) Sharpness (DP).
Calculated in compliance with the following formula,
$DP = D_{75}/D_{25}$
wherein $D_{75}$ represents a particle diameter of at 75% of a cumulative particle diameter distribution of, and $D_{25}$ represents a particle diameter at 25% of the cumulative particle diameter distribution,
from the cumulative particle size distribution on the volume basis by using the particle size analyzer, LS-230, produced by Coulter Co.
(4) Apparent specific gravity.
Measured in compliance with JIS K 6721.
(5) True specific gravity.
Measured by using a helium gravimeter, Model 1302-02, manufactured by Shimazu Mfg. Co.
(6) Amount of oil absorption.
Measured in compliance with JIS K 5101-19.
(7) Specific surface area.
Measured according to the BET method by using Sorptomatic Series 1900 manufactured by Carlo Erba Co.
(8) pH.
The pH of a 5% aqueous dispersion was measured in compliance with JIS K 5101.26.
(9) Amount of moisture absorption.
2 Grams of a sample dried at 110° C. was taken into a weighing bottle of 40×40 mm, introduced into a desiccator of which the relative humidity has been adjusted to 90% with sulfuric acid at an atmospheric temperature of 25° C., and an increase in the weight was measured and calculated after 48 hours have passed.
(10) Refractive index.
Several milligrams of the sample powder was taken onto a slide glass according to the Larsen's immersion method, a drop of a solvent of which the refractive index has been known was added thereto, a cover glass was placed thereon and, after soaked with the solvent to a sufficient degree, movement of the Becke line was observed using an optical microscope.
(11) Angle of repose.
Measured by using a powder tester, Model PT-D, manufactured by Hosokawa Tekkojo Co.
(12) Mohs' hardness.
A sample was sandwiched between two pieces of plates having smooth surfaces of which the Mohs' hardness has been known. The plates were scrubbed with each other to observe whether the plates were scratched.
(13) Pigment volume concentration (PVC).
The pigment volume concentration was calculated from the following formula,
$PVC = 100 \times B\rho/(B\rho + 0.01 \times Or \times P\rho)$
wherein Or is the amount of oil absorption (ml/100 g) of the pigment, and $P\rho$ is a density of the pigment.
In the present invention, the density $B\rho$ of the resin stands for a density 0.986 (g/ml) of the vehicle (DOP) used for measuring the amount of oil absorption.
(14) Water-soluble components.
5 Grams of the sample dried at 110° C. was taken into a beaker, 100 ml of the ion exchanged water was added thereto, boiled and was left to cool down to room temperature, followed by filtering and washing with water. The thus obtained filtrate was condensed and dry-solidified, and the solid component was measured.
(15) Chemical composition.
Measured in compliance with JIS M 8852.

TABLE 1

| Sample No. | AZ-1 | AZ-2 | AZ-3 | NP-1 | NP-2 | NP-4 | NP-7 | NP-8 | NS |
|---|---|---|---|---|---|---|---|---|---|
| Crystal type | A-type zeolite | A-type zeolite | A-type zeolite | nepheline | nepheline | carnegieite | carngieite | nepheline | nepheline syenite |
| Ave. Particle diameter (μm) | 2.8 | 15.8 | 21.5 | 3.2 | 2.7 | 2.9 | 16.0 | 17.3 | 2.6 |
| Sharpness (Dp) | 2.8 | 3.1 | 2.3 | 2.03 | 2.06 | 2.08 | 2.2 | 1.9 | 2.44 |
| Apparent specific gravity (g/ml) | 0.34 | 0.60 | 0.52 | 0.43 | 0.44 | 0.42 | 0.72 | 0.63 | 0.48 |
| True specific gravity (g/ml) | 1.50 | 1.50 | 1.50 | 2.63 | 2.62 | 2.60 | 2.62 | 2.62 | 2.62 |
| Amount of oil absorption (ml/100 g) | 34 | 30 | 16 | 48 | 38 | 40 | 32 | 24 | 39 |
| Specific surface area (m²/g) | 12.2 | 10.40 | | 10 | 10.8 | 11 | 10.3 | 10.3 | 11.2 |
| pH (5% suspn.) | 10.25 | 10.48 | 10.20 | 10.8 | 10.48 | | 10.08 | 10.45 | 10.12 |
| Amount of moisture absorption (%) | 11.8 | 12.6 | 16.1 | 0.1 | 0.05 | 0.2 | 0.2 | 0.4 | 0.2 |
| Refractive index | 1.47 | 1.47 | 1.47 | 1.53 | 1.53 | 1.50 | 1.51 | 1.52 | 1.53 |
| Angle of repose | 51 | 45 | 41 | 61 | 59 | 60 | 54 | 50 | 51 |
| Mohs' hardness | 3 | 3 | 3 | 5 | 5 | 5 | 5 | 5 | 6.5 |
| Vol. Pigment concentration (%) | 65.9 | 48.7 | 80.4 | 49.6 | 49.4 | 48.6 | 54 | 61.1 | 49.1 |
| Water-soluble components (%) | — | — | — | 0.5 | 0 | 0 | 0 | 0 | 0.9 |

TABLE 1-continued

Analysis of composition

| | | | | | | | | | |
|---|---|---|---|---|---|---|---|---|---|
| $SiO_2/Al_2O_3$ | 2.1 | 2.1 | 2.1 | 2.1 | 2.15 | 2.1 | 2.1 | 2.1 | 4.4 |
| $Al_2O_3/Na_2O$ | 1.0 | 1.0 | 1.0 | 1.0 | 0.99 | 1.0 | 1.0 | 1.0 | 1.4 |
| Ig. Loss | 14.4 | 13.0 | 9.0 | 0.2 | 0.2 | 0.3 | 1.1 | 0.1 | 0.6 |

| Sample No. | Pz-1 | PZ-2 | PZ-3 | PZ-4 | NP-10 | NP-11 | NP-12 | NP-13 |
|---|---|---|---|---|---|---|---|---|
| | 1-3-70 | 1.7–2.5–44 | 0.85–4–0 | 0.7–6–60 | PZ-1 base nepheline | PZ-2 base nepheline | PZ-3 base nepheline | PZ-4 base nepheline |
| Crystal type | Pc-type zeolite | Pc-type zeolite | Pc-type zeolite | Pc-type zeolite | | | | |
| Ave. Particle diameter ($\mu$m) | 2.5 | 1.0 | 2.9 | 2.9 | 2.8 | 1.3 | 3.2 | 3.2 |
| Sharpness (Dp) | 1.7 | 1.8 | 1.7 | 1.6 | 1.7 | 1.9 | 1.6 | 1.6 |
| Apparent specific gravity (g/ml) | 0.73 | 0.55 | 0.78 | 0.84 | 0.68 | 0.53 | 0.75 | 0.80 |
| True specific gravity (g/ml) | — | — | — | — | — | — | — | — |
| Amount of oil absorption (ml/100 g) | 33 | 44 | 30 | 35 | 35 | 48 | 33 | 38 |
| Specific surface area ($m^2/g$) | 15 | 14 | 18 | 16 | 10 | 12 | 11 | 11 |
| pH (5% suspn.) | 11.0 | 10.8 | 10.9 | 10.9 | 11.0 | 10.8 | 11.0 | 11.1 |
| Amount of moisture absorption (%) | — | — | — | — | — | — | — | — |
| Refractive index | — | — | — | — | — | — | — | — |
| Angle of repose | — | — | — | — | — | — | — | — |
| Mohs' hardness | — | — | — | — | — | — | — | — |
| Vol. Pigment concentration (%) | — | — | — | — | — | — | — | — |
| Water-soluble components (%) | — | — | — | — | — | — | — | — |
| Analysis of composition | | | | | | | | |
| $SiO_2/Al_2O_3$ | 2.80 | 2.25 | 3.20 | 3.50 | 2.80 | 2.25 | 3.20 | 3.50 |
| $Al_2O_3/Na_2O$ | | | | | | | | |
| Ig. Loss | 10.8 | 7.6 | 6.9 | 13.0 | 0.3 | 0.6 | 0.3 | 0.4 |

(Application Example 1)

Described below is the effect of thermal stabilization of when the stabilizer for resins comprising a fine powder of the regularly-shaped aluminosilicate of the present invention is added to a chlorine-contained resin.

(1-1: Evaluation by using a soft vinyl chloride sheet)

In order to make sure the effect of thermal stabilization of the stabilizer for resins of the present invention for the vinyl chloride, a soft vinyl chloride sheet was prepared as blended below and was evaluated.

(Blending)

| | | |
|---|---|---|
| Vinyl chloride resin (polymerization degree: 1050) | 100 | parts by weight |
| Dioctyl phthalate | 50 | parts by weight |
| Zinc laurate | 0.4 | parts by weight |
| Dibenzoylmethane | 0.1 | part by weight |
| Dihydroxydiphenylpropane | 0.2 | parts by weight |
| Hydrotalcite | 1.3 | parts by weight |
| Sample (sample No. NP-2 of the present invention) | 2 | parts by weight |

(Forming method)

The above-blended composition was kneaded by using a roll mill at a temperature of 150° C. for 7 minutes to obtain a homogeneous blend of a thickness of 0.5 mm, which was then heated at 160° C. under a pressure of 130 kg/cm$^2$ for 5 minutes to prepare a soft vinyl chloride sheet having a thickness of 1 mm.

(Testing method)

(16) Heat stability-sustaining time (HT).

The sample sheet was placed on a glass plate and was introduced into a Geer's thermal aging tester adjusted at 185° C., and was taken out every after 15 minutes to determine the colored degree by eyes and to measure the time until it was black-decomposed.

(17) Haze.

Measured in compliance with JIS-K 7105 by using a direct-read haze meter No. 121502302 manufactured by Toyo Seiki Seisakusho Co.

A vinyl chloride sheet was similarly prepared using the nepheline (sample No. NS) produced in Canada that has been placed in the market as an additive for resins, and was tested and evaluated. The results were as shown in Table 2. It was learned that the fine powder of the regularly-shaped aluminosilicate of the present invention that was added as a blending agent to the soft vinyl chloride, did not at all impair the resin properties.

TABLE 2

| Sample | HT (minutes) | Haze |
|---|---|---|
| NP-2 | 90 | 10.8 |
| NS | 75 | 18.9 |
| Blank | 75 | 5.3 |

(1-2: Evaluation by using a paste-type vinyl chloride sheet)
(Blending)

| | | |
|---|---|---|
| Vinyl chloride resin (paste type) | 100 | parts by weight |
| Trioctyltrimellitate | 70 | parts by weight |
| Epoxylated soybean oil | 5 | parts by weight |
| 4,4-Isopropylidenediphenyl tetraalkyl(C12C15) phosphite | 1 | part by weight |
| Stabilizer of a metal soap | 5 | parts by weight |
| Sample (sample No. NP-2 of the present invention) | 30 | parts by weight |

(Forming method)

After the plastisol blended composition of the above vinyl chloride resin was uniformly mixed, the air infiltrated under a reduced pressure was deaerated, the obtained compound was uniformly applied onto a stainless steel plate and was heated at a temperature of 230° C. under a pressure of 100 kg/cm² for 30 seconds to prepare a transparent sheet having a thickness of 1 mm. There was obtained a highly dense transparent vinyl chloride sheet exhibiting the pigment property and refractive index of the present invention.

(1-3: Evaluation by using a polypropylene resin).

A polypropylene sheet of the following blend was prepared and evaluated in order to confirm the effect for preventing the polypropylene from turning into yellow and for preventing rust of the stabilizer for resins of the present invention.

(Blending)

| Polypropylene resin containing a halogen-containing catalyst residue | 100 | parts by weight |
| --- | --- | --- |
| Sample | 15 | parts by weight |
| Titanium white | 1 | part by weight |
| Bisphenol A | 0.1 | part by weight |

(Forming method)

The above blended composition was pelletized by using an extruder at 260° C. The sample pellets were introduced into a frame of a stainless steel plate having a thickness of 1 mm and measuring 100 mm×100 mm, sandwiched between a thick ferrotype board for photography and an aluminum plate of a thickness of 2 mm, pressed at 230±3° C. for 30 minutes, transferred into a cooling press of 30±5° C., and were cooled under a pressure of about 50 kg/cm² per a plane of forming projection to obtain a 1 mm-thick polypropylene sheet after the metal mold was cooled down to 40° C. or lower. The obtained sheet possessed lustrous surface and was very flexible exhibiting white color.

(Application Example 2)

A fired melamine coating material (Amilak #1400 produced by Kansai Paint Co.) was used as a material for forming a coating film. To 100 parts by weight of this coating material was added the sample NP-2 of the present invention and was dispersed by using a dispersing machine (Disper) at 2500 rpm for 5 minutes. Then, by using an applicator of 75 mm, the mixture was applied onto a mirror-coated paper, left to stand for 20 minutes, and was then fired at 140° C. for 20 minutes to prepare a coated plate.

By using a digital glossimeter GM-3D manufactured by Murakami Shikisai Gijutsu Kenkyujo Co., the coated plate was measured for its 60° gloss (gloss factor: %). The coated plate was also prepared in the same manner by using the nepheline syenite (sample No. NS) produced in Canada that has heretofore been placed in the market as an additive for the coating materials, and was compared and evaluated. The results were as shown in Table 3. It will then be understood that the nepheline of the present invention works as a delustering agent.

TABLE 3

| | Number of parts by wt./lustering degree | | | | | |
| --- | --- | --- | --- | --- | --- | --- |
| Sample | 1 | 3 | 5 | 7 | 10 | 20 |
| NP-2 | 90.9 | 82.4 | 73.0 | 69.2 | 57.5 | 36.6 |
| NS | 94.1 | 88.9 | 84.3 | 82.0 | 76.1 | 61.2 |

(Application Example 3)

A commercially available epoxy resin for powdery coating materials was blended with the sample No. NP-2 to form a composition described below. The composition was dry-pulverized in a ceramic pot mill for 3 hours to prepare a powdery coating composition containing a fine powder of regularly-shaped aluminosilicate of the present invention as a body.

| Epoxy resin powder (Epikote 1004) | 100 | parts by weight |
| --- | --- | --- |
| Body (sample No. NP-2) | 70 | parts by weight |
| Curing agent (dicyandiamide) | 4 | parts by weight |
| Leveling agent (Modaflow, manufactured by Monsanto Co.) | 0.5 | parts by weight |

A powder of the above composition for powdery coating material was spread on a dewaxed soft steel plate maintaining a thickness of about 1 mm by using a roll, heated (about 180° C.) from the lower side by using an infrared lamp to prepare a homogeneous coating which was then fired in an oven at 180° C. for about 10 minutes to evaluate by eyes the fluidity of the coating, discoloration of the coating, gelling property, luster of the coating, transparency and adhesiveness of the coating. As a result, there was obtained a coated plate satisfying all of these properties.

(Application Example 4)

By using samples Nos. NP-2 and NP-4 and an alkyd resin, the following coating material components were blended, and were dispersion-treated by using a sand grinder for 30 minutes to prepare white aqueous coating materials.

| Resin (S-100D, NV 60%) | 100 | parts by weight |
| --- | --- | --- |
| Body (sample No. NP-2, NP-4) | 90 | parts by weight |
| Titanium white | 25 | parts by weight |
| Solvent (water/butyl cellosolve = 3/1) | 155 | parts by weight |
| Calcium carbonate | 15 | parts by weight |
| Curing agent (lead naphthenate, cobalt naphthenate) | 3.4 | parts by weight |

The coating materials were applied onto a concrete board and onto a dewaxed soft steel plate, dried at room temperature for one day and observed by eyes. There were obtained favorable white coated surfaces.

(Application Example 5) (Evaluation by using a low-density polyethylene sheet)

In order to confirm the resin properties of the stabilizer of the present invention for the polyolefin, a sheet was formed by being blended and molded as described below, and was evaluated.

(Blending)

| Low-density polyethylene resin (LDPE) | 100 | parts by weight |
| --- | --- | --- |
| BHT (2,6-di-t-4-methylphenol) | 0.5 | parts by weight |
| Sample | 5 | parts by weight |

(Forming method)

The above blended composition was kneaded by using a roll mill at a temperature of 120° C. for 3 minutes to form a homogeneous mixture having a thickness of 0.5 mm, which was then heated at 150° C. under a pressure of 150 kg/cm² for 3 minutes to prepare a low-density polyethylene sheet having a thickness of 70 μm. Under the same conditions, furthermore, a sheet was prepared having a thickness of 3 mm. The results were as shown in Table 4.

(Application Example 6) (Evaluation by using a straight-chain low-density polyethylene sheet) (Blending)

| | | |
|---|---|---|
| Straight-chain low-density polyethylene resin (LLDPE) | 100 | parts by weight |
| BHT (2,6,-di-t-4-methylphenol) | 0.5 | parts by weight |
| Sample | 5 | parts by weight |

(Forming method)

The above-blended composition was kneaded by using a roll mill at a temperature of 120° C. for 3 minutes to form a homogeneous mixture having a thickness of 0.5 mm, which was then heated at 150° C. under a pressure of 150 kg/cm² for 3 minutes to prepare a straight-chain low-density polyethylene sheet having a thickness of 80 μm. Under the same conditions, furthermore, a sheet was prepared having a thickness of 3 mm. The results were as shown in Table 4.
(Application Example 7) (Evaluation by using an ethylene/vinyl acetate copolymer) (Blending)

| | | |
|---|---|---|
| Ethylene/vinyl acetate copolymer (EVA) | 100 | parts by weight |
| BHT (2,6,-di-t-4-methylphenol) | 0.5 | parts by weight |
| Sample | 5 | parts by weight |

(Forming method)

The above blended composition was kneaded by using a roll mill at a temperature of 120° C. for 3 minutes to form a homogeneous mixture having a thickness of 0.5 mm, which was then heated at 150° C. under a pressure of 150 kg/cm² for 3 minutes to prepare an ethylene/vinyl acetate copolymer having a thickness of 80 μm. Under the same conditions, furthermore, a sheet was prepared having a thickness of 3 mm. The results were as shown in Table 4.
(Testing method) (18) Yellow index.

Measured in compliance with JIS K 7103 by using a color difference meter ND-DP manufactured by Nippon Denshoku Kogyo Co. The larger the value of negative value, the smaller the degree of yellow color.
(Comparative Examples)

The sheets were prepared in the same manner but using the nepheline syenite (sample No. NS) produced in Canada instead of using the samples of Application Examples 5, 6 and 7, and were evaluated. The results were as shown in Table 4.

TABLE 4

| Sample No. | Resin | Yellow index | Haze |
|---|---|---|---|
| NP-2 | LDPE | −0.7 | 17.6 |
| | LLDPE | −3.1 | 20.5 |
| | EVA | −0.6 | 22.0 |
| NP-4 | LDPE | −0.4 | 15.5 |
| | LLDPE | −2.0 | 16.4 |
| | EVA | 2.7 | 7.8 |
| NP-9 | LDPE | −2.1 | 12.5 |
| | LLDPE | −3.3 | 17.3 |
| | EVA | −3.5 | 12.3 |
| NP-8 | LDPE | −1.3 | 13.1 |
| | LLDPE | −2.8 | 17.5 |
| | EVA | 3.4 | 9.6 |
| NS | LDPE | 11.2 | 15.1 |
| | LLDPE | 9.8 | 19.4 |
| | EVA | 10.7 | 14.3 |
| NP-11 | LDPE | −1.5 | 9.7 |
| | LLDPE | −4.6 | 14.9 |
| | EVA | 0.6 | 9.7 |
| NP-13 | LDPE | −1.5 | 19.4 |
| | LLDPE | −5.3 | 29.5 |
| | EVA | −2.0 | 27.5 |

It will be understood from the results of the above table that the blending agents for resins comprising a fine powder of regularly-shaped aluminosilicate of the present invention do not impair resin properties when they are added to various polyolefins.

According to the present invention, there is provided a regularly-shaped aluminosilicate of the nepheline type or the carnegieite type crystalline structure having a predetermined composition and a regular particle shape, exhibiting a symmetrical particle size distribution, a low hygroscopic property and excellent pigment property.

Moreover, the regular-shaped aluminosilicate makes it possible to provide a blending agent for resins and a blending agent for coating materials, having a high pigment volume concentration, being capable of easily blended and dispersed in the resins and in the coating materials, and making it easy to carry out the blending operation.

We claim:

1. A regularly-shaped aluminosilicate comprising cubic or spherical regularly-shaped particles having a chemical composition expressed by the following formula (1), $$mM_{2/x}O \cdot Al_2O_3 \cdot nSiO_2 \tag{1}$$

wherein m is a number of from 0.9 to 1.1, M is at least one of Na, K, Ca, Mg or Zn, x is a valency of M, and n is a number of from 1.9 to 3.6, and having a nepheline or a carnegieite crystalline structure, said regularly-shaped particles having a BET specific surface area of at least 10 m²/q, an apparent specific gravity of from 0.3 to 0.8 g/cm³, an amount of oil absorption of not larger than 50 ml/100 g, a refractive index of from 1.46 to 1.56, and an amount of moisture absorption of not larger than 1% when the particles are exposed to an atmosphere of a relative humidity of 90% and a temperature of 20 to 25° C. for 48 hours.

2. A regularly-shaped aluminosilicate according to claim 1, wherein said regularly-shaped aluminosilicate has an average particle diameter of from 0.5 to 30 μm.

3. A regularly-shaped aluminosilicate according to claim 1 or 2, wherein said regularly-shaped aluminosilicate is obtained by firing a synthetic A-type zeolite having an $SiO_2/Al_2O_3$ molar ratio of from 1.9 to 2.2 at a temperature of 800 to 1500° C.

4. A regularly-shaped aluminosilicate according to claim 1 or 2, wherein said regularly-shaped aluminosilicate is obtained by firing a synthetic Pc-type zeolite having an $SiO_2/Al_2O_3$ molar ratio of from 2 to 3.6 at a temperature of 800 to 1500° C.

5. A regularly-shaped aluminosilicate according to claim 1, wherein a sharpness (DP) of particle size distribution defined by the formula/$D_{25}/D_{75}$, wherein $D_{25}$ represents a particle diameter at 25% of a cumulative particle size distribution on the volume basis as measured by a Coulter counter method, and $D_{75}$ represents a particle diameter at 75% thereof, is from 1.2 to 2.9.

6. A regularly-shaped aluminosilicate according to claim 1, wherein a Mohs' hardness is not larger than 6.

7. A resin composition comprising 100 parts by weight of a thermoplastic resin and 0.01 to 100 parts by weight of the regularly-shaped aluminosilicate of claim 1.

8. A resin composition according to claim 7, wherein said thermoplastic resin is an olefin resin or a vinyl chloride resin.

* * * * *